Patented May 27, 1952

2,598,341

UNITED STATES PATENT OFFICE 2,598,341

MANUFACTURE OF PROTEIN HYDROLYSATES

Morris J. Blish, Toledo, Ohio, assignor to International Minerals & Chemical Corporation, a corporation of New York No Drawing. Application September 22, 1948, Serial No. 50,655

2 Claims. (Cl. 260—529)

The present invention relates to the sulfuric acid hydrolysis of proteinaceous compositions. More particularly, the invention relates to the sulfuric acid hydrolysis of proteinaceous compositions and to the production of substantially ash-free protein hydrolysates, amino acids and solutions thereof.

The hydrolysis of proteinaceous compositions, either animal or vegetable in nature, is conventionally accomplished by heating said compositions under appropriate conditions with mineral acids such as hydrochloric and sulfuric. The usual procedure is to heat an animal or vegetable protein, for example casein, albumin, wheat gluten or corn gluten, with about two to ten parts by weight of mineral acid per part of protein desired to be hydrolyzed. The acidic mixture is ordinarily heated for several hours at a temperature between about 80° and about 130° C. until substantially all the protein values contained in the proteinaceous composition have been degraded into individual amino acids. The resulting hydrolysate may then be variously treated in order to produce individual amino acids or solutions containing a mixture thereof. Such products are useful as nutrient compositions which may be either orally or parenterally administered to living organisms. The isolation of individual amino acids or the production of solutions thereof is usually accomplished by neutralizing the acidic hydrolysate with an inorganic alkali metal- or alkaline earth metal oxide or hydroxide in order to adjust the pH of said hydrolysate either to neutrality or to the isoelectric point of any particular amino acid desired to be recovered from the hydrolysate. For example, it is known that an acidic hydrolysate of a protein such as wheat gluten may be adjusted to a pH between about 5.0 and about 7.0 by the addition thereto of an appropriate amount of the aforementioned alkaline material. Certain amino acids crystallize from the hydrolysate within this particular pH range and may be removed therefrom by concentrating the adjusted hydrolysate beyond the saturation point of such amino acids, and cooling the resultant concentrate to accomplish the crystallization of said acids. It is known that amino acids such as tyrosine, leucine, iso-leucine, methionine, phenylalanine and others may be crystallized from wheat gluten hydrolysates having a pH within the aforesaid range. The solution from which these amino acids have been removed may then be adjusted to about 3.2 with an acidic material such as sulfuric or hydrochloric acids. The latter pH value is the isoelectric point of glutamic acid, and this amino acid will crystallize from the solution at this point. The solution which results from glutamic acid removal comprises a complex mixture of acidic, basic and neutral amino acids, including aspartic, glutamic, glycine, threonine, alanine, proline, lysine, arginine, histidine and minor amounts of other amino acids which are inherently present in the acid hydrolysates of any particular proteinaceous substance. The aforesaid amino acid-containing liquor will also contain substantial amounts of inorganic salts which are formed by reason of the particular hydrolytic and neutralization reagents employed. For example, in the event that hydrochloric acid has been employed as a hydrolytic reagent, the previously described amino acid-containing liquor will contain such chlorides as those of sodium, potassium, ammonium, calcium, etc., depending upon the particular alkaline reagent which has been employed to neutralize the hydrochloric acid present in an acidic hydrolysate produced by hydrolyzing a protein with such an acid. The presence of ammonium salts is due to the partial degradation of protein by HCl with the attendant formation of ammonia which combines directly with hydrochloric acid to form ammonium chloride. In the event that sulfuric acid has been employed as a hydrolytic reagent, the amino acid-containing liquor will contain substantial amounts of the sulfate salts of the aforesaid metals and ammonia. The comparatively large inorganic salt content of such solutions precludes their use for many purposes, including those previously mentioned herein. It is extremely difficult to remove these inorganic salts from such solutions, due to their solubility in the complex amino acid mixture.

It has previously been proposed to reduce the ammonia or ammonium salt concentration of sulfuric acid protein hydrolysates by adding thereto a slight excess of an alkaline earth metal compound in order to precipitate substantially all of the sulfate ions present in the hydrolysate. A patent issued to Ikeda, No. 1,035,591, describes the sulfuric acid hydrolysis of a vegetable protein such as wheat gluten, followed by the addition of a slight excess of slaked lime to the hydrolysate. This presumably accomplishes the removal of substantially all of the sulfate ions present in the acidic hydrolysate in the form of insoluble calcium sulfate, and the latter material is removed from the slightly alkaline hydrolysate. The resulting solution is then concentrated in a vacuum evaporator, during which process ammonia and other gaseous substances are removed from the liquid. This process is said to result in a concentrate which contains a considerable quantity of glutamic acid in the form of its salts with ammonia, organic bases, calcium, etc. This procedure, therefore, does not result in the removal of substantially all of the metallic ions from the hydrolysate, such as ammonium and calcium, and these remain present therein in the subsequent steps of the Ikeda process.

Another process which is directed to the removal of inorganic ions from a sulfuric acid protein hydrolysate is disclosed in the patent issued to F. A. Hoglan, No. 2,433,219. According to this process a vegetable protein, for example wheat gluten, is subjected to sulfuric acid hydrolysis, followed by the addition of an alkaline earth metal compound, for example, calcium hydroxide, to the hydrolysate in order to give the same a pH of between about 10.5 and about 11.5. This presumably accomplishes the removal of substantially all the sulfate ions originally present in the acidic hydrolysate in the form of insoluble calcium sulfate. The resulting solution contains an excess of calcium ions and these are removed therefrom by treating the alkaline solution with a reagent selected from the group consisting of carbon dioxide and alkali metal carbonates and bicarbonates. An alternative process is described in patent application, Serial No. 771,393, which is a continuation-in-part of Patent No. 2,433,219, wherein the excess calcium ions are removed from the alkaline solution by adding thereto a reagent selected from the group consisting of sulfur dioxide and alkali metal sulfites and bisulfites. The aforesaid reagents are added to the alkaline calcium-containing hydrolysate in such amounts as to produce a final solution having a pH of about 8.0 or between about 8.0 and about 9.0. These procedures presumably precipitate substantially all of the calcium present in the solution which is uncombined with amino acids, in the form of insoluble calcium carbonate or calcium sulfite as the case might be. Amino acids such as tyrosine and leucine are recovered from the concentrated hydrolysate at a pH value of about 7.0, after which the resulting solution is adjusted to a pH of about 3.2 with sulfuric acid or hydrochloric acid. Glutamic acid is crystallized and recovered from the acidic solution. The latter two processes also result in the formation of a so-called end liquor or "glutamic acid filtrate" which contains a plurality of acidic, basic and neutral amino acids of the type previously herein described. This end liquor also contains substantial amounts of inorganic salts such as sodium sulfate, ammonium sulfate, or sodium chloride and ammonium chloride, depending on the reagents employed. Sodium ions are present due to the addition of sodium hydroxide to the hydrolysate which is first adjusted to a pH of between about 10.5 and 11.5 with an excess of lime, followed by the addition thereto of sulfur dioxide or carbon dioxide together with a sufficient amount of sodium hydroxide to maintain the pH of the solution at between about 8.0 and about 9.0 during the pH adjustment procedure. Alternatively, sodium ions may be present due to the addition of alkali metal sulfites, bisulfites, carbonates or bicarbonates to the highly alkaline hydrolysate in order to precipitate excess calcium therefrom as calcium sulfite or carbonate. The sodium ions remain in the aqueous phase throughout subsequent operational steps for amino acid recovery, and are ultimately found in the end liquor in the form of sodium sulfate or sodium chloride. The ammonium salts present in the end liquor are probably due to the combination of ammonia, which is formed during the hydrolysis, with the sulfuric acid hydrolytic agent, the ammonium ion not being subsequently removed from the solution. These inorganic compounds comprise about 30% by weight of the total dry solids content of the end liquor just described.

It is a particular object of the invention to provide a process for the production of a substantially ash-free protein hydrolysate, said hydrolysate having been produced by the sulfuric acid hydrolysis of a protein composition.

It is a further object of the invention to provide a process for the production of a solution of amino acids which is substantially free from ammonia compounds, said amino acids having been produced by the sulfuric acid hydrolysis of a protein composition.

It is still a further object of the invention to provide a process for the preparation of individual amino acids or mixtures thereof which are substantially free from inorganic compounds, said amino acids having been produced by the sulfuric acid hydrolysis of a protein composition.

The above objects as well as others which will become apparent upon a complete understanding of the invention which is hereinafter fully described may be accomplished by employing the instant novel process which affords a procedure whereby amino acids, solutions thereof or protein hydrolysates may be obtained which are substantially free from ash-producing materials such as the alkali metals and their compounds. The entire novel process is conducted in the absence of, and without the addition of, alkali metal compounds. In addition, precautions are taken to remove ammonia and ammonium compounds. In general the instant process is conducted by subjecting a proteinaceous composition to hydrolysis with sulfuric acid until substantially all of the protein values contained therein have been hydrolyzed, and treating the resultant acidic hydrolysate with a sufficient amount of agent selected from the group consisting of alkaline earth metal oxides, hydroxides and carbonates to give the hydrolysate a pH between about 8.0 and about 12.0 preferably between about 10.5 and about 12.0. When the aforesaid compounds are added to the hydrolysate in such amounts, the bulk of the sulfate ions present in the acidic hydrolysate will be removed therefrom in the form of insoluble alkaline earth metal sulfates. As disclosed in the aforementioned Hoglan patent, it has been found that removal of insoluble organic matter, or humin, from the hydrolysate is advantageously accomplished within this particular pH range, together with the precipitated alkaline earth metal sulfate. The resultant alkaline solution is then heated and/or evaporated until the vapor therefrom is substantially free from ammonia. When a protein hydrolysate of the type herein described is heated and/or evaporated within the aforesaid pH range, substantially all of the ammonia which is present in said hydrolysate, presumably due to the degradation of a portion of the proteinaceous material during acid hydrolysis, may be removed therefrom. This heating and/or evaporation results in the formation of a solution which is substantially free from ammonium sulfate and the amino acids or solutions thereof which are subsequently produced from the hydrolysate are similarly free from this material. Following this heating and/or evaporation procedure, the resultant solution is then treated with acidic material selected from the group consisting of acids and acid anhydrides whose salts with alkaline earth metals are substantially water-insoluble. For this purpose reagents such as phosphoric, sulfuric, carbonic, oxalic and sulfurous acids and the anhydrides thereof are particularly suitable. One or more of these reagents are added to the alkaline hydrolysate in amounts sufficient to give said hydrolysate a pH of not more than about 8.0 and preferably less than about 7.0. Such an operation causes the precipitation of alkaline earth metal ions from the aforesaid alkaline hydrolysate in the form of the salts of the acidic reagents just described. If calcium is selected as the alkaline earth metal and depending upon the particular pH at which calcium is removed from the solution, either calcium which is uncombined with amino acids or said calcium plus calcium which is combined with amino acids may be substantially removed from the hydrolysate. It has been found that at a pH between about 5.0 and about 7.0 the first mentioned calcium may be substantially removed from the hydrolysate, whereas if sufficient acidic material is added to the hydrolysate to reduce its pH to between about 2.5 and about 3.5, both uncombined and combined calcium may be removed from the solution in the form of insoluble calcium salts of the aforesaid acidic reagents. In any event at least one pH adjustment of the hydrolysate will be made to between about 2.5 and about 3.5 in order to insure substantially complete removal of all the calcium present in the hydrolysate. In some instances it will be desirable to recover individual amino acids from the protein hydrolysate and this may be accomplished by employing a preliminary pH adjustment of said hydrolysate to between about 5.0 and about 7.0 by adding thereto acidic reagents of the type previously described. Insoluble matter comprising alkaline earth metal salts precipitate from the adjusted solution, and may be removed therefrom by any suitable means such as by filtration or centrifugation. The resultant solution is then evaporated, preferably in a vacuum, beyond the saturation point of tyrosine and leucine. The concentrate is then cooled, whereupon the aforesaid amino acids, together with minor amounts of methionine, phenylalanine, and valine crystallize from the solution, due to prevailing conditions of supersaturation. This mixture of amino acids may be subsequently treated in accordance with methods which are familiar to those skilled in the art in order to achieve the separation of the individual amino acids. The amino acid mixture just described is substantially free from inorganic salts such as ammonium and calcium sulfate. The solution resulting from the separation of the aforesaid amino acids from the hydrolysate may then be treated with an additional amount of acidic material of the type herein previously described to give said solution a pH between about 2.5 and about 3.5, whereupon an additional amount of alkaline earth metal salts will precipitate therefrom. The majority of these salts are formed from the calcium which is combined with amino acids in a solution having a pH range of between about 5.0 and about 7.0. Following the separation of the precipitated alkaline earth metal salts, the resulting substantially alkaline earth metal-free solution is concentrated beyond the saturation point of glutamic acid. Upon cooling the concentrated solution, crystalline glutamic acid separates therefrom and may be isolated by means of operations previously described. The resultant acidic liquor or end liquor, comprises a solution of a heterogeneous mixture of amino acids including aspartic, glutamic, glycine, alanine, proline and other amino acids, the relative proportions of said amino acids being dependent upon the particular proteinaceous substance which has been hydrolyzed. When proteinaceous compositions are hydrolyzed and subsequently treated in accordance with the instant novel process, it will be found that the resultant end liquor which is obtained following the crystallization of glutamic acid as just described will contain less than about 3% by weight of inorganic compounds or "ash," based upon the solids content of said end liquor. This is in contrast with the substantial quantity of inorganic compounds which are present in equivalent end liquors or amino acid-containing solutions produced in accordance with processes which have been heretofore employed.

More particularly, the instant process involves the sulfuric acid hydrolysis of a proteinaceous composition which may be either animal or vegetable in character. For example, such proteins as casein, albumin, blood meal, wheat gluten, corn gluten, soya bean protein, cotton seed protein and others may be heated with a suitable amount of dilute sulfuric acid until substantially all of the protein values contained therein have been converted to amino acids. The amount of sulfuric acid employed will depend upon the concentration of $H_2SO_4$, and upon the temperature and duration of hydrolysis.

A particularly effective hydrolytic reagent comprises sulfuric acid containing about 50% by weight of $H_2SO_4$. The temperature during hydrolysis may be adjusted to between about 100° and about 150° C., preferably conducting the hydrolysis at about 115° C. Following the hydrolysis of substantially all of the protein values which are contained in the proteinaceous substance being subjected to hydrolysis, a sufficient amount of agent selected from the group consisting of alkaline earth metal oxides, hydroxides and carbonates is added to the acidic hydrolysate to give the latter a pH between about 10.5 and about 12.0. The aforesaid alkaline reagents include the oxides, hydroxides and carbonates of calcium, barium, strontium, etc., the calcium compounds being preferably employed due to economic considerations. Following the addition of alkaline earth metal compounds to the acidic hydrolysate, the insoluble matter which is formed, including alkaline earth metal sulfate and insoluble organic matter, or humin, are separated from the alkaline solution by means of filtration, centrifugation or equivalent means. The resultant alkaline solution is then heated and/or evaporated, preferably in a vacuum, until the vapor therefrom is substantially free from ammonia. The extent of evaporation or heating will depend upon the amount of ammonia compounds present in the alkaline solution, which in turn depends upon the particular type of protein originally subjected to hydrolysis.

Following the ammonia removal step, the resultant solution is then treated with acidic material selected from the group consisting of acids and acid anhydrides whose salts with alkaline earth metals are substantially water-insoluble. Included within the term "acidic material" are such agents as phosphoric, sulfuric, carbonic, oxalic, sulfurous acids and others, and the anhydrides thereof. Particularly advantageous are reagents selected from the group consisting of sulfurous, sulfuric, phosphoric and carbonic acids, and anhydrides thereof. The amount of such agents which are added to the hydrolysate at this point will depend upon whether it is desired to recover individual amino acids from the hydrolysate and upon the total amount of excess alkaline earth metal ion which is to be removed therefrom.

As previously mentioned herein, in the event that it is desirable to recover tyrosine and leucine from the hydrolysate together with minor quantities of other amino acids, a sufficient amount of the aforesaid acidic agents may be added to the alkaline hydrolysate to give the same a pH between about 5.0 and about 7.0. This will also accomplish the partial removal of residual alkaline earth metal ion from the alkaline hydrolysate, namely such calcium as is uncombined with amino acids in the form of salts thereof. It is the preferable practice to remove the precipitated alkaline earth metal compounds followed by heating the resultant solution, preferably in a vacuum, beyond the saturation point of tyrosine and leucine. Upon cooling the concentrate, for example to room temperature, said amino acids crystallize therefrom and may be separated by filtration or centrifugation procedures. The resultant solution contains the calcium salts of glutamic and aspartic acids, and all of the other amino acids usually present in the previously described end liquors. In order to recover glutamic acid from such a solution its pH is adjusted to between about 2.5 and about 3.5 with acidic material of the type previously described. The use of sulfuric acid is particularly suitable for this pH adjustment in that the small amount of calcium which is contained in the solution in the form of calcium salts of amino acids may be precipitated therefrom in the form of insoluble calcium sulfate. Following the removal of the latter compound from the solution, it may be concentrated beyond the saturation point of glutamic acid. The concentrated solution upon cooling to room temperature and standing for a period of between about 1 and about 5 days, will produce crystals of glutamic acid which may be separated therefrom by conventional operations of the type previously herein described. The glutamic acid product is substantially free from inorganic compounds or ash-producing substances, as is the resulting end liquor which contains a heterogeneous mixture of amino acids of the type previously described.

In order to more fully illustrate the nature and character of the invention, but with no intention of being limited thereby, the following example is recited:

Example

About 200 gm. of wheat gluten was hydrolyzed by heating the same with about 400 gm. of sulfuric acid containing about 50% $H_2SO_4$ by weight, for a period of between about 6 and about 12 hours at a temperature of about 115° C. After cooling the hydrolysate, an equal volume of water was added thereto. An aqueous slurry containing about 250 gm. of hydrated lime was added to the diluted hydrolysate, resulting in a mixture having a pH of about 11.6. This resulted in the formation of a precipitate of calcium sulfate which was removed from the alkaline mixture together with insoluble organic matter, or humin, produced during hydrolysis. The alkaline solution which contained a large amount of calcium sulfate wash water was then concentrated in vacuo by heating at a temperature between about 50° and about 85° C. to about 60% of its original volume. This accomplishes the removal of substantially all of the ammonia from the hydrolysate. To the concentrated solution was added gaseous $SO_2$ until the pH thereof was reduced to about 5.2. The insoluble calcium sulfite which precipitated from the adjusted solution was removed therefrom by filtration and the filtrate concentrated in vacuo at a temperature of about 60° C. to a weight of about 330 gm. Upon cooling this concentrate, a mixture of amino acids which contains tyrosine, and leucine, together with minor amounts of methionine, phenylalanine, valine, and other amino acids crystallized therefrom. The insoluble amino acids were removed from the solution by filtration and the filtrate was diluted with about 500 ml. of water, heated to a temperature between about 60° and about 70° C. and adjusted to a pH of about 2.7 by adding thereto a 50% solution of sulfuric acid. Insoluble calcium sulfate precipitated at this point, was separated from the solution by filtration, and the filtrate concentrated in a vacuum at a temperature of about 60° C. to a weight of about 330 gm. After a 5-day crystallization period about 46.1 gm. of glutamic acid, on a dry basis, was recovered. This product has a purity of about 92%. The solution or end liquor resulting from the glutamic acid filtration weighed about 294 gm., contained about 36% by weight of solids on a dry basis, and contained only about 0.9% ash constituents.

The end liquor which is produced by employing the above described process has a tan to brown color, in contrast to black solutions which have been produced in accordance with previously known methods of protein hydrolysis. It is adaptable to many uses in which a relatively pure mixture of amino acids is required, for example, as dietary supplements. The complex mixture of amino acids contained in such a solution comprises glutamic acid and aspartic acid, as well as varying amounts of arginine, lysine, histidine, proline, serine, glycine, threonine, alanine and others. These amino acids may be isolated by methods which are familiar to those skilled in the art, for example, by employing ion exchange procedures as described in patents issued to Block, Nos. 2,386,926 and 2,429,666.

While the above described example of the instant novel process discloses the treatment of a wheat gluten hydrolysate whereby a mixture of tyrosine and leucine as well as glutamic acid are produced with the resultant formation of an end liquor containing a heterogeneous mixture of substantially ash-free amino acids, it is to be understood that any of the amino acid-containing solutions or individual amino acids herein described may be produced by employing obvious and equivalent modifications and extensions of this process. Thus it is possible to produce composite protein hydrolysates containing all the so-called "essential" amino acids with the possible exception of tryptophane which is usually destroyed by acid hydrolysis. Such hydrolysates are substantially free of inorganic compounds and other ash-producing substances which are inherently present in equivalent products which have been produced in accordance with previously known methods. Furthermore, it is not intended to limit the instant process to the procedural or operational details herein set forth, but obvious modifications and extensions thereof are deemed to be within the scope of the invention.

Having thus fully described the nature and character of the invention, what is desired to be secured by Letters Patent is:

1. In a process involving the sulfuric acid hydrolysis of a proteinaceous composition, followed by treating the hydrolysate with a sufficient amount of agent selected from the group consisting of alkaline earth metal oxides, hydroxides, and carbonates to give the hydrolysate a pH between about 10.5 and about 12.0, and separating insoluble matter therefrom; the improvements comprising heating the resultant alkaline solution until the vapor therefrom is substantially free from ammonia, adding to the resultant solution acidic material selected from the group consisting of acids and acid anhydrides whose salts with alkaline earth metals are substantially water-insoluble in an amount sufficient to give said solution a pH between about 5.0 and about 7.0, separating insoluble matter comprising insoluble alkaline earth metal salts from the adjusted solution, concentrating the resultant solution beyond the saturation point of tyrosine and leucine, cooling the concentrate and separating said crystallized amino acids therefrom, treating the resultant solution with an additional amount of the aforesaid acidic material to give said solution a pH between about 2.5 and about 3.5, separating insoluble alkaline earth metal salts from the resultant solution, concentrating the substantially alkaline earth metal-free solution to the saturation point of glutamic acid, cooling the concentrated solution, and separating crystallized glutamic acid therefrom.

2. In a process involving the sulfuric acid hydrolysis of a proteinaceous composition, followed by treating the hydrolysate with a sufficient amount of agent selected from the group consisting of alkaline earth metal oxides, hydroxides, and carbonates to give the hydrolysate a pH between about 10.5 and about 12.0, and separating insoluble matter therefrom; the improvements comprising heating the resultant alkaline solution until the vapor therefrom is substantially free from ammonia, treating the resultant solution with agent selected from the group consisting of sulfurous, sulfuric, phosphoric, and carbonic acids in an amount sufficient to give said solution a pH between about 5.0 and about 7.0, separating insoluble alkaline earth metal salts of said acids from the resultant mixture, concentrating the resultant solution to the saturation point of tyrosine and leucine, cooling the concentrate and separating said amino acids therefrom, treating the resultant solution with sulfuric acid to give the same a pH between about 2.5 and about 3.5, separating insoluble alkaline earth metal compounds from the adjusted solution, concentrating the substantially alkaline earth metal-free solution beyond the saturation point of glutamic acid, cooling the concentrated solution, and separating crystallized glutamic acid therefrom, thereby recovering a substantially ash-free solution of amino acids.

MORRIS J. BLISH.

REFERENCES CITED

The following references are of record in the file of this patent:

UNITED STATES PATENTS

| Number | Name | Date |
|---|---|---|
| 1,035,591 | Ikeda et al. | Aug. 13, 1912 |
| 2,180,637 | Kemmerer | Nov. 21, 1939 |
| 2,347,220 | Shildneck | Apr. 25, 1944 |
| 2,373,342 | Royal | Apr. 10, 1945 |
| 2,387,824 | Block | Oct. 30, 1945 |
| 2,387,976 | Bersworth | Oct. 30, 1945 |
| 2,433,219 | Hoglan | Dec. 23, 1947 |
| 2,485,859 | Butturini et al. | Oct. 25, 1949 |